July 27, 1926.

G. W. WOOD

UNIVERSAL LEVEL

Filed Jan. 24, 1924

1,593,961

Inventor

George W. Wood

By Lacey Lacey, Attorneys

Patented July 27, 1926.

1,593,961

UNITED STATES PATENT OFFICE.

GEORGE W. WOOD, OF WHITE HALL, NEW YORK.

UNIVERSAL LEVEL.

Application filed January 24, 1924. Serial No. 688,190.

My invention relates to a leveling instrument which can be read from any side thereof, that is to say, if placed on a horizontal surface the bubble can be seen from the top or side of the level and it may be turned and rested on any of the other three main sides. It can also be used in upright position to get the plumb of a wall and the bubble observed either from the front or the sides of the instrument.

The instrument has a casing and the main characteristic of the invention resides in the provision of a hollow glass ball enclosed in the casing and transversely directed apertures through which a part of the surface of the globe or glass ball can be seen from the outside. It will accordingly be understood that the construction of this instrument is simpler than the usual leveling instrument where separate glass tubes have to be provided for leveling and plumbing.

In the accompanying drawing, one embodiment of the invention is illustrated, and—

Figure 1:
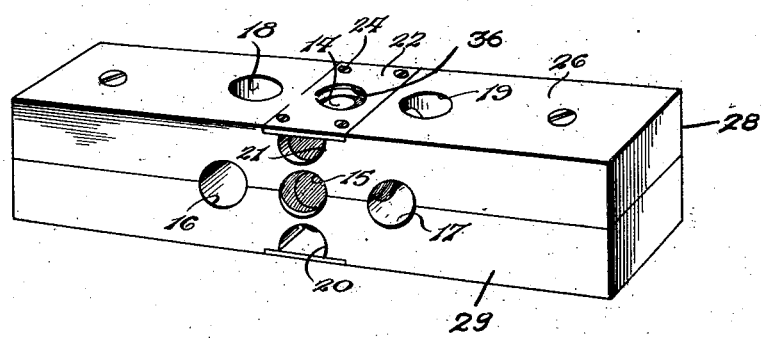
Figure 1 is a perspective view of the instrument.

The casing is preferably of square cross section and has four rectangular sides and flat ends at right angles to the sides. The casing is preferably made up of two wooden or metallic blocks 10 and 11 joined together along a central longitudinal plane dividing the casing into two parts of the same dimensions. The two blocks are held together by screws 12 with countersunk heads and nuts so that the surfaces are perfectly smooth.

In the middle of the casing is provided a spherical chamber which is obtained by providing a semi-spherical recess in each block 10 and 11. In this chamber fits snugly a glass ball 13 having thin walls and being filled with a suitable liquid leaving a small bubble 14 therein. It is essential that the glass ball be made perfectly spherical and that the walls are of uniform thickness throughout.

Central apertures 15 and 36 are bored at right angles to each other, the axes thereof intersecting in the center of the glass ball and running at right angles to the four sides of the casing. To the right and left of the central apertures are provided apertures 16 and 17 having their axes substantially tangential to the surface of the ball and in the plane of the dividing surface 25 between the two blocks and still other tangential apertures 18 and 19 running at right angles to the apertures 16 and 17 and perpendicular to the dividing plane 25. Each of these tangential apertures exposes a small portion of the circumference of the ball so that the bubble may be seen in whichever aperture may be uppermost.

Beside the already enumerated apertures there are still other apertures 20 and 21 having their axes parallel with the axis of the aperture 15 and in the same transverse plane of the casing and tangential to the ball. Accordingly, these two apertures 20 and 21 will cut through the opposite side faces 26 and 27 of the casing shown at top and bottom in the figures and for this reason cover plates 22—23 are placed across the blocks on these sides of the casing. The plates are preferably secured by screws 24. When the casing is all metal the plates would be unnecessary.

Figure 2:
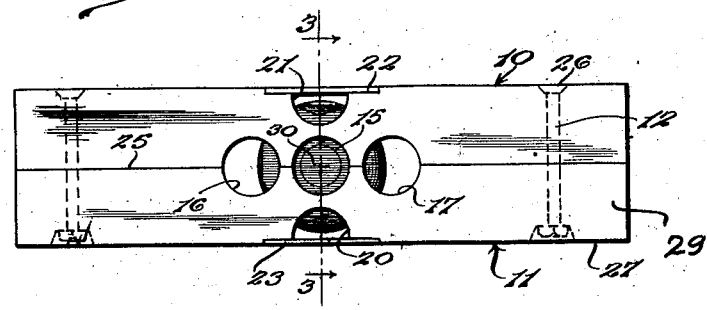
Figure 2 is a side elevation.
Figure 3:
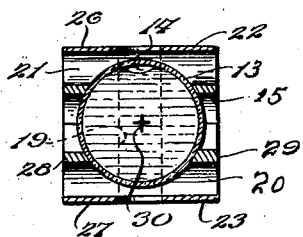
Figure 3 is a transverse section along line 3—3 of Figure 2.

When using the instrument to find the level of a plane surface it is placed as seen in Figure 2 on one of the side faces, 27 for instance, upon the surface to be leveled, and the bubble 14 may then be observed at the top end of the aperture 36 through the plate 22 or from the side of the aperture 21 as found most convenient. Similarly, the observation can be made by inverting the instrument, placing it on the side 26 of the block 10 with the plate 23 uppermost when the bubble may again be observed through the opening in the said plate or from the side through the aperture 20 which will then be uppermost. By placing the instrument on either side 28 or 29 similar observation may be made at the aperture 15.

To find the plumb of a wall, the instrument is placed in upright position with one of the sides against the wall when the bubble may be observed through either one of the apertures 17 and 19, in case they are uppermost, or 16 and 18, if they are uppermost. In this manner the instrument is universal and is very easily read in any position it is held.

It is evident that the cost of manufacturing the instrument is very small as the two blocks can be planed and made to true dimensions and the apertures will be accurately positioned by drilling perpendicularly to the side faces.

As only one glass ball is necessary both for leveling and plumbing, this also tends to lessen the cost of the instrument. Providing two glass tubes at right angles to each other and positioning the same correctly requires a great deal of adjustment in ordinary instruments.

Having thus described the invention, what is claimed as new is:

1. An instrument of the class described comprising a casing having flat rectangular sides and ends at right angles to said sides, said casing comprising a pair of blocks of rectangular cross section joined together along a longitudinal medial plane of the casing and a central chamber consisting of a semi-spherical recess in each of the adjacent surfaces of said blocks, and a hollow ball of transparent material fitting in said chamber and partly filled with liquid so as to provide a bubble, apertures being provided in the casing with their axes intersecting at the center of the ball and disposed at right angles to the sides of the casing.

2. An instrument of the class described comprising a casing having flat rectangular sides and ends at right angles to said sides, said casing comprising a pair of blocks of rectangular cross section joined together along a longitudinal medial plane of the casing and a central chamber consisting of a semi-spherical recess in each of the adjacent surfaces of said blocks, and a hollow ball of transparent material fitting in said chamber and filled with liquid so as to provide a bubble, apertures being provided in the casing with their axes intersecting at the center of the ball and disposed at right angles to the sides of the casing, and other apertures being provided and having their axes parallel to the axes of the first-mentioned apertures but spaced at a distance from the center of said ball so as to expose the circumference thereof.

3. An instrument of the class described comprising a casing having flat rectangular sides, ends at right angles to said sides, said casing comprising a pair of blocks of rectangular cross section joined together along a longitudinal medial plane of the casing and a central chamber consisting of a semi-spherical recess provided in each of the adjacent surfaces of said blocks, and a hollow ball of transparent material fitting in said chamber and partly filled with liquid so as to provide a bubble, apertures being provided in the casing with their axes intersecting at the center of the ball and disposed at right angles to the sides of the casing, and other apertures being provided and having their axes parallel to the axes of the first-mentioned apertures but spaced at a distance from the center of said ball so as to expose the circumference thereof, the axes of some of said other apertures being situated in the dividing plane between said blocks.

In testimony whereof I affix my signature.

GEORGE W. WOOD. [L. S.]